United States Patent
Bossman et al.

(10) Patent No.: US 7,644,063 B2
(45) Date of Patent: Jan. 5, 2010

(54) APPARATUS, SYSTEM, AND METHOD FOR ENSURING QUERY EXECUTION PLAN STABILITY IN A DATABASE MANAGEMENT SYSTEM

(75) Inventors: Patrick D. Bossman, Alexandria, VA (US); Frank D. Bower, San Jose, CA (US); John J. Campbell, Alton (GB); You-Chin Fuh, San Jose, CA (US); Adarsh R. Pannu, San Jose, CA (US); Terrence P. Purcell, New Berlin, IL (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/840,703

(22) Filed: Aug. 17, 2007

(65) Prior Publication Data
US 2009/0049012 A1 Feb. 19, 2009

(51) Int. Cl.
G06F 17/30 (2006.01)

(52) U.S. Cl. .................... 707/2; 715/200; 715/201; 715/277

(58) Field of Classification Search ............ None
See application file for complete search history.

(56) References Cited

U.S. PATENT DOCUMENTS

| | | | |
|---|---|---|---|
| 5,940,819 A | 8/1999 | Beavin et al. | |
| 6,006,220 A | 12/1999 | Haderle et al. | |
| 6,219,660 B1 | 4/2001 | Haderle et al. | |
| 7,080,062 B1 * | 7/2006 | Leung et al. | 707/2 |
| 7,275,051 B2 | 9/2007 | Hrle | |
| 7,552,110 B2 * | 6/2009 | Hrle et al. | 707/3 |
| 2004/0019587 A1 | 1/2004 | Fuh et al. | |
| 2004/0039729 A1 | 2/2004 | Boger et al. | |
| 2005/0065921 A1 | 3/2005 | Hrle et al. | 707/3 |
| 2005/0177557 A1 | 8/2005 | Ziauddin et al. | 707/3 |
| 2006/0074874 A1 | 4/2006 | Day et al. | 707/3 |
| 2006/0212428 A1 | 9/2006 | Nelson | 707/3 |

OTHER PUBLICATIONS

Zhu et al., Building Multistates Cost ModelsFor Dynamic Multidatabase Environments, 33 pages.*
Purcell et al., "Insurance for Your Access Paths Across REBINDS", Intelligent Optimizer, www.idug.org , pp. 37-39.

* cited by examiner

*Primary Examiner*—John R. Cottingham
*Assistant Examiner*—Noosha Arjomandi
(74) *Attorney, Agent, or Firm*—Kunzler & McKenzie

(57) ABSTRACT

An apparatus, system, and method are disclosed for ensuring query execution plan stability in a database management system. The present invention binds a static database query to a new query execution plan (QEP) that produces the same result set as an original QEP bound to the static database query. Next, the present invention identifies one of the original QEP and the new QEP as a primary QEP and automatically collects execution statistics for the original QEP and the new QEP. Finally, the present invention automatically selects one of the original QEP and the new QEP as the primary QEP in response to completion of the automatic collection of execution statistics, the primary QEP selected such that the automatically selected QEP provides optimal execution performance based on performance criteria in comparison to the automatically unselected QEP, the primary QEP selected based on the execution statistics.

18 Claims, 6 Drawing Sheets

APPARATUS, SYSTEM, AND METHOD FOR ENSURING QUERY EXECUTION PLAN STABILITY IN A DATABASE MANAGEMENT SYSTEM

BACKGROUND OF THE INVENTION

1. Field of the Invention

This invention relates to database management systems and more particularly relates to binding and rebinding of query execution plans to database queries.

2. Description of the Related Art

Both critical and non-critical transactions rely on database technologies to store, retrieve, update, and delete data. Database management systems (DBMS) such as Oracle, DB2, IMS, MYSQL, are highly tuned and carefully managed to ensure that database queries to the DBMS are serviced and returned as quickly as possible. These queries may be made using various languages including SQL, XPATH, and the like. The database queries may be dynamic (meaning the query is generated as needed with a form that is unknown until they are received and likely to change between requests) or static (meaning the database query is predefined does not change form between requests, although the data values of the query may change). Static database queries lend themselves to high optimization and tuning because the form does not change.

Typically, a DBMS will store the text representing a static database query and/or assign a unique identifier for the static database query. The static database query is then associated with a query execution plan (QEP), also referred to as a query execution path. This association is referred to as a binding. The QEP identifies a set of indexes, tables, caches, and other optimization aides that the DBMS reference the QEP each time the DBMS receives a request to execute the static database query associated with the QEP. By following the QEP for a static database query a DBMS can significantly reduce response times.

A database administrator (DBA), or other user tasked with maintaining and tuning the DBMS, uses an assortment of tools and technologies to influence DB2 to generate a QEP that optimizes the use of DBMS resources and minimizes the response times for the static database query. Various tools and algorithms exist for identifying an inefficient QEP and determining a new QEP that is expected to perform better. Significant time and expense has been spent working to ensure that the new QEP is in fact more efficient than a previous QEP.

Unfortunately, these tools and algorithms are unable to provide a 100% guarantee that the new QEP for a particular database query is optimal. When a new QEP bound to a static database query in place of an original QEP performs less optimally than the original QEP, the QEP binding for the static database query has regressed. Regression of QEP bindings with its consequential reduced performance can be very costly to an organization in terms of lost reputation, failure to meet quality of service obligations, operations disruptions, time and expense in troubleshooting the matter, and the like The problem of QEP binding regression currently unsolved due to the high number of factors which cause one DBMS environment to operate so differently from another. Some of these factors include the amount of query traffic, the variety of traffic loads, user request patterns, hardware configurations, processing bottlenecks, I/O bottlenecks, and the like. The problem of QEP binding regression is further complicated because the effects of binding a new QEP to a particular static database query may not be determinable within a predictable period of time due to usage patterns and the like. In addition, the configuration of the DBMS is such that administrative actions taken to improve performance of one set of static database queries can adversely affect another unknown set of static database queries.

Solutions exist for identifying when a QEP is regressive and for computing a new QEP that is predicted to provide more optimal performance than an original QEP. Unfortunately, these solutions still require the DBA to review the proposed new QEP and decide whether to bind the static database query to the new QEP.

The involvement of the DBA is a significant step. The DBA may need to consider bindings of new QEPs for hundreds or thousands of static database queries. The DBA must weigh the potential performance improvement against the potential that the new QEP is in fact not an improvement. The results of this decision are typically not known until the decision is made and the effects are experienced. Consequently, a DBA is often very reluctant to perform a rebinding without more proof that there will not be a regression in DBMS performance.

To minimize the impact of regression, a DBA will not perform the rebinding, or if the rebinding is performed, the DBA is prepared to quickly revert to original QEPs for a batch of static queries if performance suffers. In certain DBMS systems reverting to an original QEP is impossible. Unfortunately, this may return the status quo, but the benefit of the non-regressive new QEPs is lost at the expense of a few regressive QEPs.

SUMMARY OF THE INVENTION

From the foregoing discussion, it should be apparent that a need exists for an apparatus, system, and method that ensures query execution plan stability in a database management system. Beneficially, such an apparatus, system, and method would automatically monitor an original QEP and a new QEP, determine which QEP is optimal and automatically use the most optimal QEP such that regressive QEPs are avoided and bound QEPs are stable in performance improvement.

The present invention has been developed in response to the present state of the art, and in particular, in response to the problems and needs in the art that have not yet been fully solved by currently available database query execution plan binding solutions. Accordingly, the present invention has been developed to provide an apparatus, system, and computer program product that ensures query execution plan stability in a database management system that overcomes many or all of the above-discussed shortcomings in the art.

A computer program product is presented for ensuring query execution plan stability in a database management system. The computer program product binds a static database query to a new query execution plan (QEP) that produces the same result set as an original QEP bound to the static database query. Next, the computer program product identifies one of the original QEP and the new QEP as a primary QEP and automatically collects execution statistics for the original QEP and the new QEP. Finally, the computer program product automatically selects one of the original QEP and the new QEP as the primary QEP in response to completion of the automatic collection of execution statistics, the primary QEP selected such that the automatically selected QEP provides optimal execution performance based on performance criteria in comparison to the automatically unselected QEP, the primary QEP selected based on the execution statistics.

The computer program product, in one embodiment, is configured to ensure query execution plan stability in a database management system. The computer program product comprises a computer readable medium having computer usable program code executable to perform operations for ensuring query execution plan stability in a database management system. The operations of the computer program product include receiving a new query execution plan (QEP) that produces the same result set as an original QEP bound to a static database query, binding the static database query to the new QEP and to the original QEP, identifying the new QEP as a primary QEP, and associating a status indicator with the bound static database query, the primary QEP, and the secondary QEP.

Next, the operations include setting the status indicator to indicate the secondary QEP is unsettled, executing the secondary QEP in response to a first request to execute the bound static database query and the status indicator indicating that the primary QEP and secondary QEP are not settled, collecting execution statistics during execution of the secondary QEP, setting the status indicator to indicate the primary QEP is unsettled and send a response to the first request, executing the primary QEP in response to a second request to execute the bound static database query and the status indicator indicating the primary QEP is unsettled, collecting execution statistics during execution of the primary QEP, and determining whether the primary QEP or the secondary QEP provides optimal execution performance based on the collected execution statistics and on performance criteria.

Finally, the computer program product includes an operation to automatically swap a QEP of the primary QEP with a QEP of the secondary QEP in response to the QEP associated with the secondary QEP providing more optimal results than a QEP associated with the primary QEP and setting the status indicator to indicate that the primary QEP and secondary QEP are settled and send a response to the second request.

A system of the present invention is also presented to ensure query execution plan stability. The system may be embodied as a database management system. In particular, the system, in one embodiment, includes at least one processor within a computer system in electronic communication with at least one database stored on at least one persistent storage device and at least one client computer system over a communication network, a memory configured to store operational data and computer instructions executable by the at least one processor.

The computer instructions are configured to cause the computer system to: receive a new query execution plan (QEP), in response to a user command provided by a user interface in communication with the computer system, the QEP producing the same result set as an original QEP bound to a static database query, store the new QEP in the at least one persistent storage device and bind the static database query to the new QEP, designate the new QEP as a primary QEP and automatically collect execution statistics for the original QEP and the primary QEP in response to at least two requests to execute the static database query.

The computer instructions are also configured to automatically swap the new QEP with the original QEP, such that the original QEP becomes the primary QEP and the new QEP becomes a secondary QEP in response to the execution statistics of the original QEP exceeding a user-configurable threshold, the user-configurable threshold comprising at least one execution statistic for the new QEP.

The system may further include wherein automatic collection of execution statistics and automatic swapping of the new QEP and the original QEP is controlled based on a status indicator that assumes one of three states, the states comprising settled, secondary QEP unsettled, and primary QEP unsettled, the original QEP designated as a secondary QEP.

The system may further include computer instructions configured to cause the computer system to receive a revert command from a user in response to automatic swapping of one of the original QEP and the new QEP as the primary QEP and swap the QEP identified as the primary QEP with the QEP identified as the secondary QEP in response to the revert command. In certain embodiments, the system comprises computer instructions configured to set the status indicator to a secondary QEP unsettled state in response to a user command, the secondary QEP unsettled state reinitiating comparison of execution statistics for the primary QEP and the secondary QEP in response Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
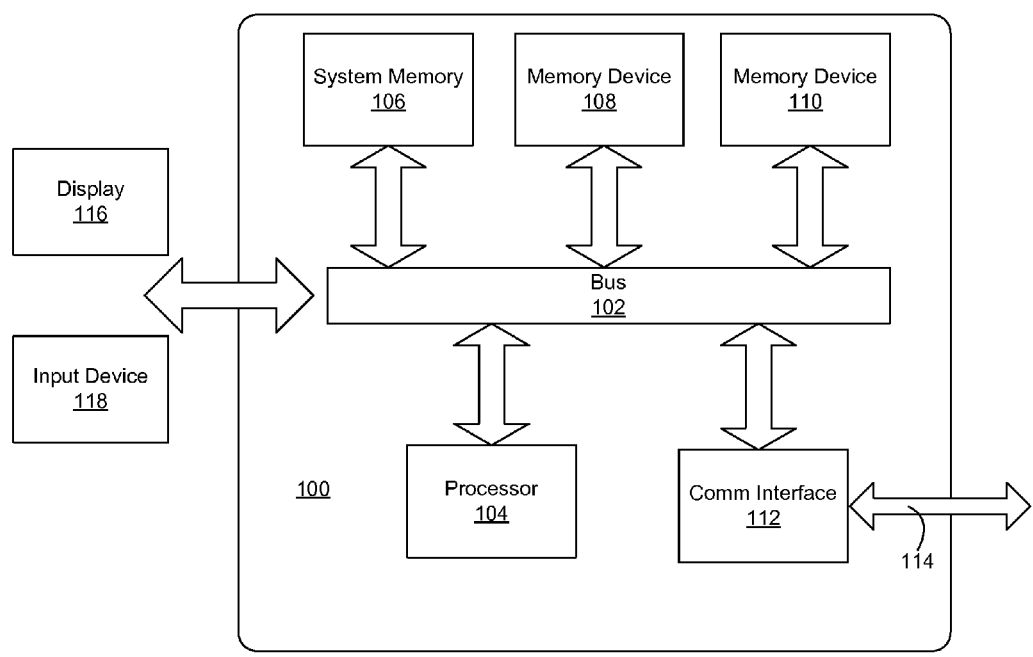
FIG. 1 is a schematic block diagram illustrating an exemplary system of hardware components capable of implementing embodiments of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, systems or networks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating machine readable data, causing machine readable data to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating an exemplary system 100 of hardware components capable of implementing embodiments of the present invention. System 100 may generally include a system bus 102 that is in communication with a processor 104 and a system memory 106. At least one additional memory device 108, 110, such as a hard disk drive, server, stand alone database, or other non-volatile memory, may also be in communication with the bus 102. The additional memory devices 108, 110 may be configured to store data, programs, instructions, database queries in text or compiled form, and any other information that may be needed to operate a processor or computer. Additionally, the memory devices 108, 110 may also serve as databases or datastores for relational database management systems (DBMS). Alternatively, system 100 may be configured to access an external DBMS through a communication interface 112, which may be in communication with the system bus 102, and communication link 114. System 100 may further include a user display 116 and an input device 118 for interacting (receiving input and presenting output) with a user.

In operation, system 100 may be used to implement a DBMS that provides results in response to a plurality of database queries. The DBMS may receive the database queries in accordance with various query database protocols include SQL, XQUERY, and the like. Computer executable logic for implementing the DBMS resides on one or more of the system memory 106, and the memory devices 108, 110 in accordance with certain embodiments of the present invention. The processor 104 executes one or more instructions originating from one or more of the system memory 106, and the memory devices 108, 110. The term "computer readable medium" as used herein refers to a medium that participates in providing instructions to processor 104 for execution.

Figure 2:
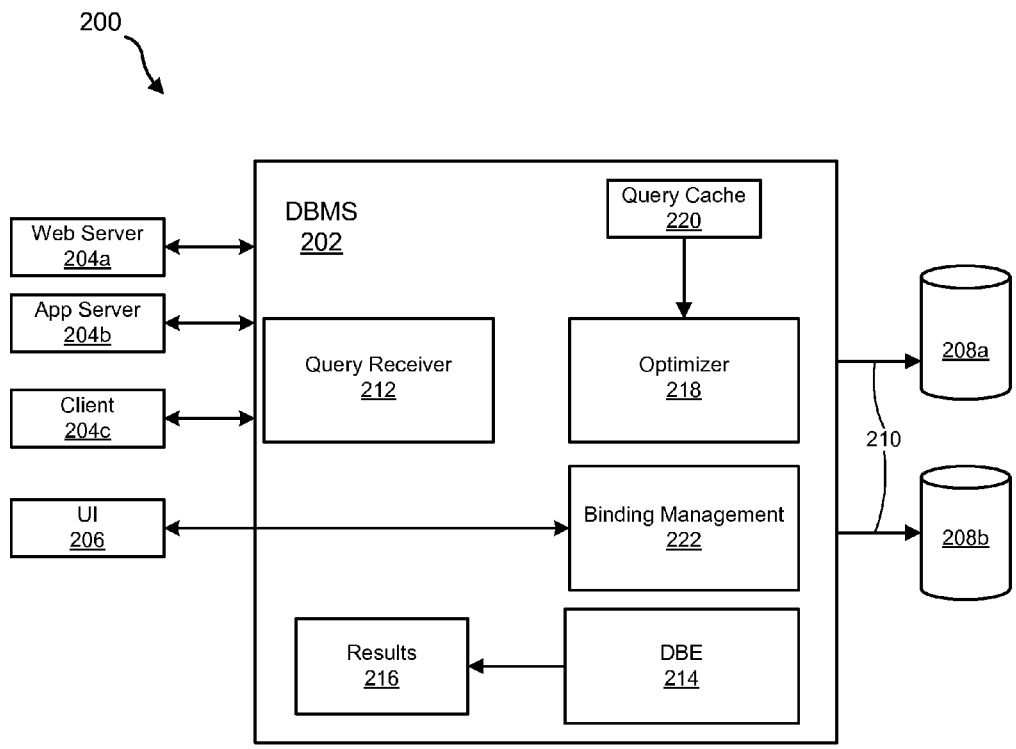
FIG. 2 is a schematic block diagram illustrating one embodiment of an system for ensuring query execution plan stability in a database management system in accordance with the present invention.

FIG. 2 is a schematic block diagram illustrating one embodiment of an system 200 for ensuring query execution plan stability in a DBMS 202 in accordance with the present invention. The system 200 includes a DBMS 202, one or more clients 204a-c in communication with the DBMS 202, a user interface (UI) 206, and one or more datastores 208a-b. The DBMS 202 communicates with the clients 204a-c, UI 206, and datastores 208a-b using various local or remote communications links such as wired and wireless network, communication busses and the like. The communication links 210 implement various protocols including TCPIP, Fibre Channel, and the like.

The DBMS 202 is configured to respond to database queries by sending results as soon as possible. The DBMS 202, also referred to as a database server, responds to database queries from clients such as a web server 204a, an application server 204b, or a client 204c configured to issue requests in accordance with industry accepted formats and protocols. To provide optimal performance the DBMS 202 includes a variety of optimization components and aides for handling static database queries. "Static database queries" as used herein refers to database queries that do not change between two subsequent requests for the same information. In other words, while the data values associated with query predicates may change between subsequent requests, the predicates and the fields of data requested do not change. The static nature of such queries permits the DBMS 202 to include various optimization techniques.

The DBMS 202 includes a query receiver 212 and a database engine (DBE) 214. The query receiver 212 and the database engine 214 cooperate to provide the basic functionality of the DBMS 202. The query receiver 212 accepts database requests from the clients 204. The query receiver 212 parses the requests and provides a set of instructions to the DBE 214 for fulfilling the request. The instructions may be in computer executable format such as computer object code, script code, interpretive code, or the like. The instructions typically include references to one or more query fulfillment aides such as indexes, caches, and the like. These instructions constitute a query execution plan (QEP). The DBE 214 follows the instructions to retrieve the requested data from the datastores 208.

The datastores 208 comprise one or more storage devices configured to hold data in an organized manner that facilitates prompt retrieval. Datastores 208 are well known in the art and have various configurations including single disk storage devices, data storage subsystems, data storage networked devices, and the like.

The DBE 214 provides the results to a results module 216. The results module 216 packages the result data into a format compatible with the format requested by the client 204 and send the results to the client 204.

To increase the efficiency and minimize the response time of the DBMS 202, the DBMS 202 includes an optimizer 218 and a query cache 220. The optimizer 218 cooperates with the query receiver 212 to provide the most optimal set of retrieval instructions to the DBE 214 as possible. The optimizer 218 performs such functions as identifying that a database query is a static database query, caching of one or more QEPs in the query cache 220, mapping of static database query requests to corresponding QEPs based on QEP bindings, identifying QEPs that are inefficient, generating new QEP that use various indexes, and other optimization tools of the DBMS 202.

The query cache 220 stores QEPs and other DBMS related information that is likely to be needed in the near future. In one embodiment, the query cache 202 comprises volatile memory devices 108, 110.

The DBMS 202 also includes a binding management module 222. The binding management module 222 associates at least one QEP with a static database query. The static database query includes a predefined set of fields and a predefined predicate. Values for parts of the predicate may change between calls of the static database query but the format and structure remains unchanged. This static attribute of a static database query permits a QEP to be associated with a particular static database query as long as needed. This association is referred to herein as a binding.

By binding static database queries to at least one QEP the DBMS 202 saves the time and overhead of generating a QEP each time a request is received for the same static database query. The query receiver 212 and optimizer 218 cooperate to identify a static database query that is bound to a QEP. Next, the bound QEP is accessed and executed to fulfill the static database query.

In one embodiment, the binding management module 222 permits a user or database administrator to control which static database queries are bound to QEPs and allows the static database query to be bound to two or more QEPs with one of the two or more QEPs designated as a primary QEP. How QEPs are generated manually or automatically or when QEPs are generated is not relevant to the embodiments of the present invention.

The binding management module 222 serves to establish a binding between each one of a plurality of static database queries and a plurality of defined QEPs. If a static database query is new, the static database query may be bound to a single QEP. For static database queries that are already bound to a QEP, the binding management module 222 binds a new QEP to the same static database query and designates one of the two QEPs as the primary QEP and the other QEP as secondary QEP.

Figure 3:
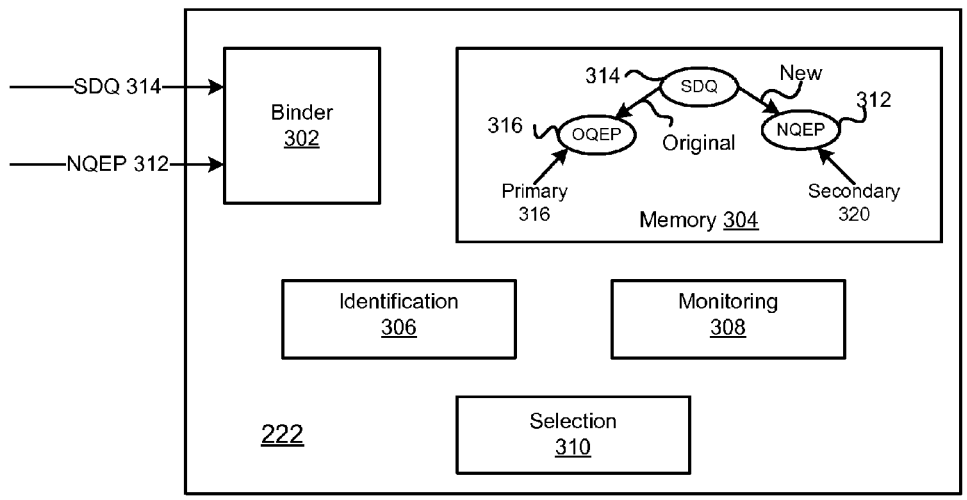
FIG. 3 is a schematic block diagram illustrating one embodiment of a binding management module for ensuring query execution plan stability in a database management system in accordance with the present invention.
Figure 3:
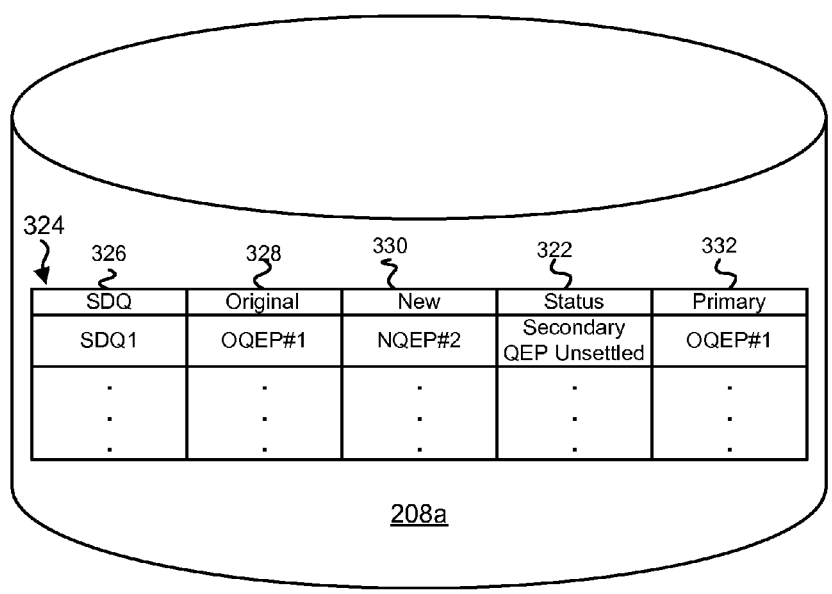

FIG. 3 illustrates one embodiment of the binding management module 222 for ensuring query execution plan stability in a database management system in accordance with the present invention. The binding management module 222 manages the bindings between a static database query (SDQ) and one or more QEPs. The binding management module 222 includes a binder 302, an optional memory 304, an identification module 306, a monitoring module 308, and a selection module 310. The binding management module 222 ensures that if a new QEP 312 is provided and bound to a given SDQ 314 the proper QEP, either the original QEP 316 or the new QEP 312, is used such that performance of the overall DBMS 202 does not suffer as a result of binding or rebinding of QEPs.

The binder 302 creates the associations between a SDQ 314 and the QEP. The association may be in the form of a pointer or other indicator identifying the QEP with a particular SDQ 314. In certain embodiments, the text of the SDQ 314 is not retained. Instead, a unique identifier for the SDQ 314 may be generated by the optimizer 218 or the binder 302. The actual text defining the SDQ 314 may be discarded or retained in an archive or datastore 208. If a SDQ 314 has no QEP 316, the binder 302 cooperates with the optimizer to identify or generate an original QEP 316. The binder 302 stores the association of SDQ 314 and QEP 316 either in memory 304 such as the query cache 220, RAM, or a datastore 208.

In addition, if the binding management module 222 is instructed to bind the SDQ 314 to a new QEP 312 and the SDQ 314 currently has a binding to an original QEP 316, the binder 302 generates a second binding, one between the SDQ 314 and the new QEP 312. This dual binding of a SDQ 314 is illustrated within the optional memory structure 304. In contrast to conventional DBMSs, the binder 302 binds an SDQ 314 to two or more QEPs 312, 316 at the same time. Of course the new QEP 312 generates the same query result as the original QEP 316. Advantageously, the DBMS 202 may use either QEP 312, 316 to fulfill a query request using the SDQ 314.

The identification module 306 serves to designate or identify one of the new QEP 312 and the original QEP 316 as a primary QEP 318. The primary QEP 318 is the QEP that the DBMS 202 will select for each received request for the associated SDQ 314, provided the identification of a primary QEP 318 has been resolved. When a SDQ 314 is first bound to two or more QEPs 316, 312 the primary QEP 318 not resolved but one of the QEPs 316, 312 can be designated as primary QEP 318 until sufficient information is gathered for the binding management module 222 to make a final determination as to which QEP 316, 312 is the primary QEP 318. The other QEPs 316, 312 then become the secondary QEP 320, third QEP, etc. The secondary QEP 320 is selected during an automatic performance regression avoidance phase, described below.

In one embodiment, the identification module 306 is configured to identify either one of the original QEP 316 and the new QEP 312 as a primary QEP 318. Which QEP is designated initially as primary QEP 318 may be controlled by a user-configurable setting or by a default designation. Ideally, each new QEP 312 is provided for rebinding because the new QEP 312 improves the performance of the DBMS 202 with respect to the associated SDQ 314. So in certain embodiments, the identification module 306 automatically initially designates the new QEP 312 as the primary QEP 318 until execution statistics can prove the initial designation should be changed. However, because the new QEP 312 is not always an improvement, the present invention automatically determines that there is no improvement and automatically reverts to an original QEP 316 if execution statistics indicate such a need.

In another embodiment, a more pessimistic view prevails and the identification module 306 automatically initially designates the original QEP 316 as the primary QEP 318 until execution statistics can prove the initial designation should be changed. In another embodiment, the primary QEP 318 may be designated randomly. Of course this initial designation may be controlled by a user, a command parameter, or a user-configurable parameter.

The monitoring module 308 serves to collect execution statistics such that a determination can be automatically made whether to keep the original designation of the primary QEP 318 or to switch the designations of the secondary QEP 320 and the primary QEP 318. The monitoring module 308 manages an automatic performance regression avoidance phase. During this phase the monitoring module 308 collects sufficient execution data (statistics) to enable the selection module 310 to make a determination regarding which QEP 312, 316 is to be the primary QEP 318.

In one embodiment, the monitoring module 308 uses a status indicator 322. The status indicator 322 tracks the state of the automatic performance regression avoidance phase. The status indicator 322, in one embodiment, has one of three states including settled, secondary unsettled, and primary unsettled. The settled state indicates that the automatic performance regression avoidance phase is complete and the primary QEP 318 has been decided and provides the best performance in comparison to any other QEPs bound to the SDQ 314. The secondary unsettled indicates that the secondary QEP has not yet had sufficient execution statistics collected and should be selected for execution the next time monitoring is performed such that execution statistics can be collected. The primary QEP unsettled indicates that the QEP currently designated as primary QEP has not yet had sufficient execution statistics collected and should be selected for execution the next time monitoring is performed such that execution statistics can be collected.

In one embodiment, the monitoring module 308 cooperates with the database engine (DBE) 214 to gather the execution statistics. In another embodiment, the monitoring module 308 automatically gathers execution statistics during normal online operation of the DBMS 202. Alternatively, user controlled parameters may require the monitoring module 308 to gather statistics during off-peak time periods.

In one embodiment, the monitoring module 308 collects execution statistics based on at least two separate requests to execute the associated SDQ 314. Those in the art recognize that any number of requests may be required to be run such that sufficient execution statistics are available. In response to a first request, the monitoring module 308 selects the secondary QEP 320. The monitoring module 308 collects and stores execution statistics for the secondary QEP 320. Once a second request to execute the SDQ 314 is received, the monitoring module 308 selects the primary QEP 318. The monitoring module 308 collects and stores execution statistics for the primary QEP 318. Those of skill in the art recognize that the primary QEP 318 may be selected for statistics collection first and then the secondary QEP 320 in different embodiments. Once the monitoring module 308 collects execution statistics for both the primary QEP 318 and the secondary QEP 320, a determination is automatically made regarding whether to change the designation of the primary QEP 318 to provide the optimal execution performance for the given SDQ 314.

The selection module 310 determines whether to change the designation of the primary QEP 318. The selection module 310 compares the execution statistics of the primary QEP 318 and the execution statistics of the secondary QEP 320. The selection module 310 applies performance criteria as part of the comparison of execution statistics of the primary QEP 318 and the execution statistics of the secondary QEP 320. For example, the selection module 310 may include performance criteria that require that certain statistics for the secondary QEP exceed, or are an improvement over, certain statistics for the primary QEP by a threshold amount.

In certain embodiments, the performance criteria is predefined. Alternatively, the UI 206 may allow a user such as a database administrator to adjust the thresholds and/or the performance criteria considered by the selection module 310 in determining which QEP 316, 312 is to be automatically designated as the primary QEP 318. Those of skill in the art recognize that making these adjustments available for customization by a user is within the skill of those in the art.

If the execution statistics of the primary QEP 318 exceed, or are an improvement over, those of the secondary QEP 320, the selection module 310 makes no changes to the designation of the primary QEP 318. If the execution statistics of the secondary QEP 320 exceed, or are an improvement over, those of the primary QEP 318, the selection module 310 selects the QEP originally designated as secondary QEP 320 to become the primary QEP 318. The selection module 310 in one embodiment also makes a QEP originally designated as primary QEP 318 the secondary QEP 320.

Whether an execution statistic for the primary QEP 318 exceeds, or are an improvement over, that of a secondary QEP 320 depends on the type of statistic. Certain statistics quantify a favorable or positive characteristic based on one value being higher than the other, while other statistics quantify a favorable or positive characteristic based on one value being lower than the other. For example if the statistic is execution time, the QEP with the lowest execution time will have a statistic that exceeds that of the other QEP. Alternatively if the statistic is number of rows referenced in the result for a comparable execution time, the QEP referencing the lower number of rows is an improvement over the number of rows statistic for a second QEP.

In one embodiment, the selection module 310 sets the status indicator 322 to settled if the selection module 310 changes the QEP designated as the primary QEP 318 and statistics are available for both QEPs 312, 316. When the status indicator 322 is settled, the automatic performance regression avoidance phase is complete and the binding management module 222 recognizes that no automatic determination regarding of the primary QEP 318 is needed. Consequently, in certain embodiments, no further monitoring or comparison overhead is incurred on subsequent requests to execute the particular SDQ 314.

Advantageously, the selection module 310 automatically changes the QEP binding for a SDQ 314 based on the performance of either the original QEP 316 or the new QEP 312. Consequently, if for example, a new QEP 312 degrades performance the database administrator need not troubleshoot to identify and correct the problem, the binding management module 222 automatically, reverts to the QEP that provides the optimal performance, in this example the original QEP 316.

The frequency in which the SDQ 314 is requested may vary considerably. Consequently in one embodiment, the monitoring module 308 stores the status indicator 322 in a datastore 208a for use on subsequent SDQ 314 requests. FIG. 3 illustrates a table 324 for one example that stores a SDQ identifier 326, the original QEP identifier 328 (or the original QEP 316), the new QEP identifier 330 (or the new QEP 312), the status indicator 322, and an indicator of the primary QEP 332. The datastore 208a may store this data for hundreds or thousands of SDQ 314.

In one embodiment, the binding management module 222 retains both the primary QEP 318 and the secondary QEP 320, even after the status indicator 322 is set to settled. In this manner, a user operating the UI 206 can reverse the automatic decision of which QEP is the primary QEP 318 based on other design or management considerations. In addition, the database administrator may use the information for various other diagnostic or analysis activities. Alternatively in certain embodiments, the secondary QEP 320 may be discarded for example to conserve storage.

Figure 4:
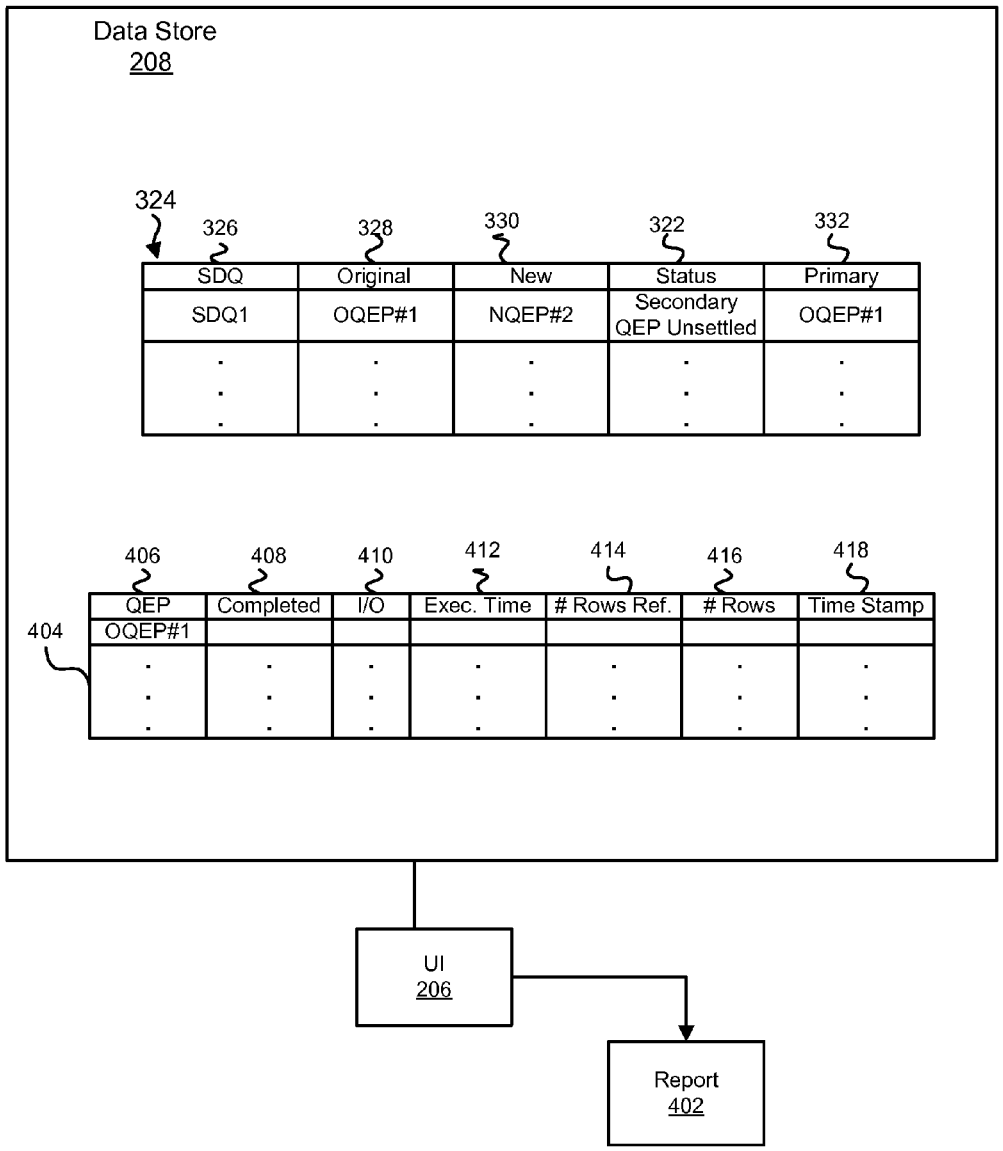
FIG. 4 is a schematic block diagram illustrating components that support a binding management module for ensuring query execution plan stability in a database management system in accordance with an embodiment of the present invention.

With retention of the SDQ 326, the original QEP 328, the new QEP 330, the status indicator 322, and an indicator of the primary QEP 332, a myriad of reporting and analysis operations are available in different embodiments of the present invention. FIG. 4 illustrates components that support a binding management module for accessing this data and reporting information about this data 324. In one embodiment, the system 200 includes a report module 402 that interacts with the user interface 206 and responds to commands from a user. The report module 402 may operate manually in response to user input or automatically based on certain programming or scripts.

The user interface 206 permits a user to perform diagnostic analysis, review and troubleshooting of the system 200, if needed. In particular, the user interface 206 permits a user easily access and review the data in the table 324. The user may issue a command causing the user interface 206 to cooperate with the report module 402 to produce a report indicating the data elements in table 324.

In addition, the report module 402 may retrieve execution statistics related to each of the QEPs tracked within the table 324, both the original QEP 328 and the new QEP 330. The binding management module 222 stores these statistics in the data store 208. In one embodiment, the statistics are stored in a separate table 404 keyed by a unique ID for each QEP 402. The report module 402 generates reports that may include any of the data fields of table 324, including the static database query, the QEP automatically selected as the primary QEP, the QEP automatically selected as the secondary QEP, and execution statistics for the QEPs.

A representative example of some of the execution statistics that embodiments of the binding management module 222 stores includes whether or not execution of the query completed successfully or not, the quantity and rate of Input and output requests generated by the QEP (also known as the I/O profile), the execution time for the QEP, the number of rows the QEP references, the number of rows the QEP returns, and a time stamp for when the QEP was executed. Those of skill in the art recognize that the monitoring module 308 may gather various other execution statistics within the scope of the present invention.

Those of skill in the art recognize that the reports generated by the report module 402 may be predefined and may include one or more of the fields of table 324 or table 404 and may filter the rows based on predefined or ad-hoc queries. In addition, the report module 402 may support custom-defined reports.

In certain embodiments, the user interface 206 permits a user to modify one or more fields of the data in QEP table 324. For example, in response to a user command, the user interface 206 may change the state of the status indicator 322 for a select number of SDQs 326. Consequently, a user may manually override the automatic selection made by the binding management module 222. In one embodiment, the user issues a revert command by way of the user interface 206. The revert command causes the QEP identified as the primary QEP 318/332 to be designated as the secondary QEP 320 and the QEP that was identified as the secondary QEP 320 to be designated as the primary QEP 318/332. In one embodiment, the user interface 206 implements the revert command by changing the QEP identified in the primary QEP field 332 to be the value of the secondary QEP 320. The status indicator 322 may remain unchanged, settled. Alternatively, a revert command may include swapping the QEPs and setting the status indicator 322 to a state that causes the binding management module 222 to once again collect execution statistics for the primary QEP 318 and/or the secondary QEP 320.

In one embodiment, a user issues one or more commands to change the status indicator 322 such that the binding management module 222 collects execution statistics for one of the primary QEP 318, the secondary QEP 320, or both. Such a command may set the status indicator 322 to any one of its states, "settled," "secondary unsettled," and "primary unsettled." In this manner, a user may make changes to the database (i.e. new indexes, caching adjustments, etc.), and manually initiate automatic reevaluation of which of the primary QEP 318 and the secondary QEP 320 have the best execution statistics in response to those changes.

Figure 5:
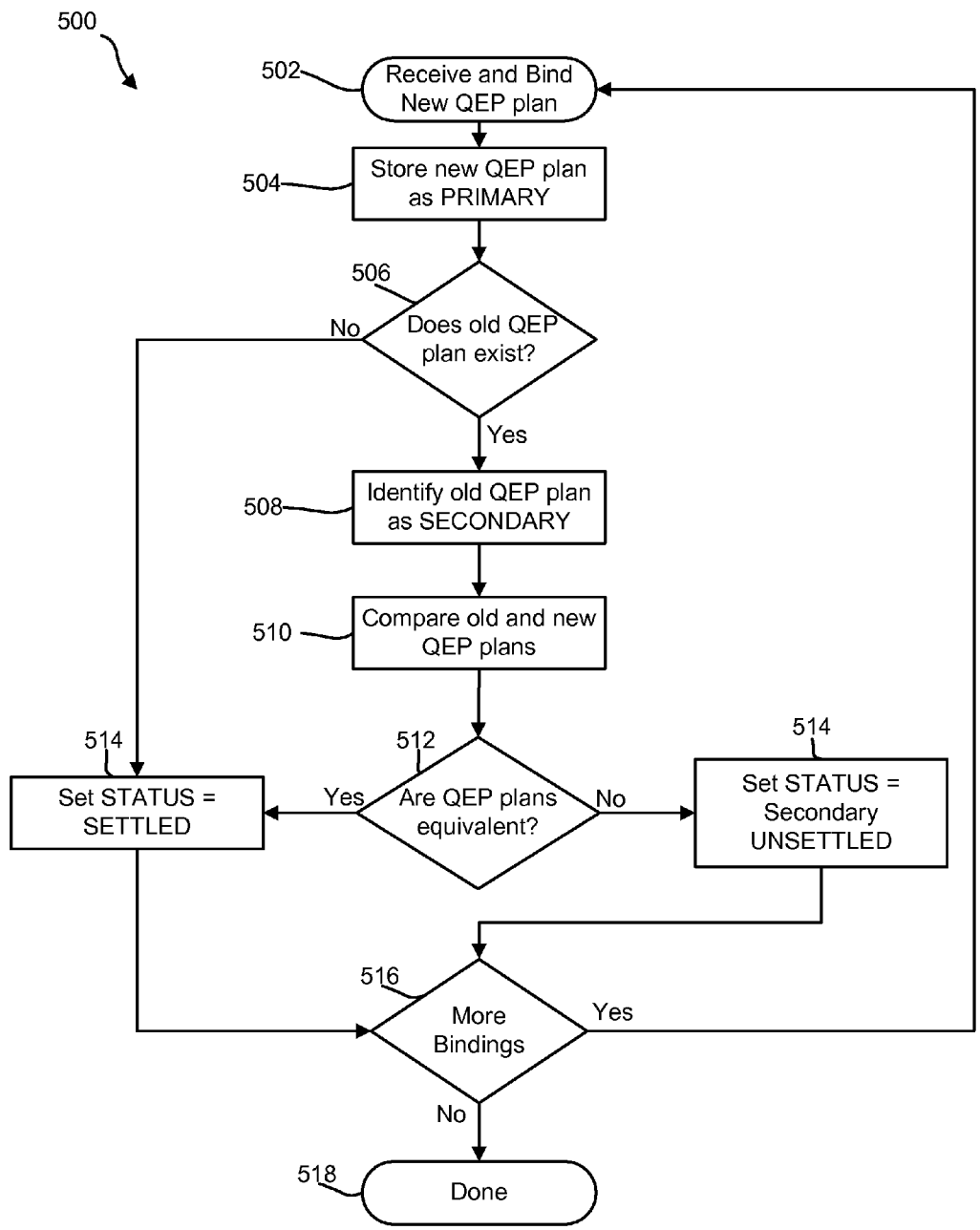
FIG. 5 is a schematic flow chart diagram illustrating one embodiment of a method for ensuring query execution plan stability in a database management system in accordance with the present invention.

FIG. 5 is a schematic flow chart diagram illustrating one embodiment of a method 500 for ensuring query execution plan stability in a database management system in accordance with the present invention. The method 500 begins when the DBMS 202 receives a command to bind one or more new QEPs 312 to one or more new SDQs 314. The SDQ 314 (the actual text) may be provided with the command. Alternatively, an identifier for the SDQ 314 may be provided. Using method 500 during the binding phase in a DBMS 202 provides peace of mind to a database administrator that if new QEPs 312 exist that provide worse performance, those will be automatically switched back to the original QEPs 316.

In one embodiment, as part of the binding command the binding management module 222 stores 504 the new QEP 312 associated with the SDQ 314 and identifies the new QEP 312 automatically as the primary QEP 318. Next, the binding management module 222 determines 506 whether an original or old QEP 316 exists for the particular SDQ 314. If so, the binding management module 222 identifies 508 the old QEP 316 as the secondary QEP 320. Next, the binding management module 222 compares 510 the old QEP 316 and the new QEP 312 to determine any differences between the two plans. If the binding management module 222 determines 512 that the QEPs 312, 316 are equivalent, the binding management module 222 sets 514 a status indicator 322 to "SETTLED." Similarly, if no old QEP 316 exists, the binding management module 222 sets 514 the status indicator 322 to "SETTLED." In this manner, the overhead of regression avoidance (i.e. statistics collection) is prevented for SDQs 314 that are new, do not have an existing QEP 316, or have not changed in relation to an original QEP 316.

If the binding management module 222 determines 512 that the QEPs 312, 316 are not equivalent, the binding management module 222 sets 514 the status indicator 322 to "Secondary UNSETTLED." The status indicator 322 is associated with the SDQ 314, the secondary QEP 320, and the primary QEP 318. With the status indicator 322 set to "Secondary UNSETTLED," when a request is received to execute the SDQ 314, the DBMS 202 will execute the secondary QEP 320 such that performance statistics can be collected. Next, the binding management module 222 determines 516 whether more QEP bindings are to be performed, If so, the method repeats at step 502. If not, the method 500 ends 518.

Figure 6:
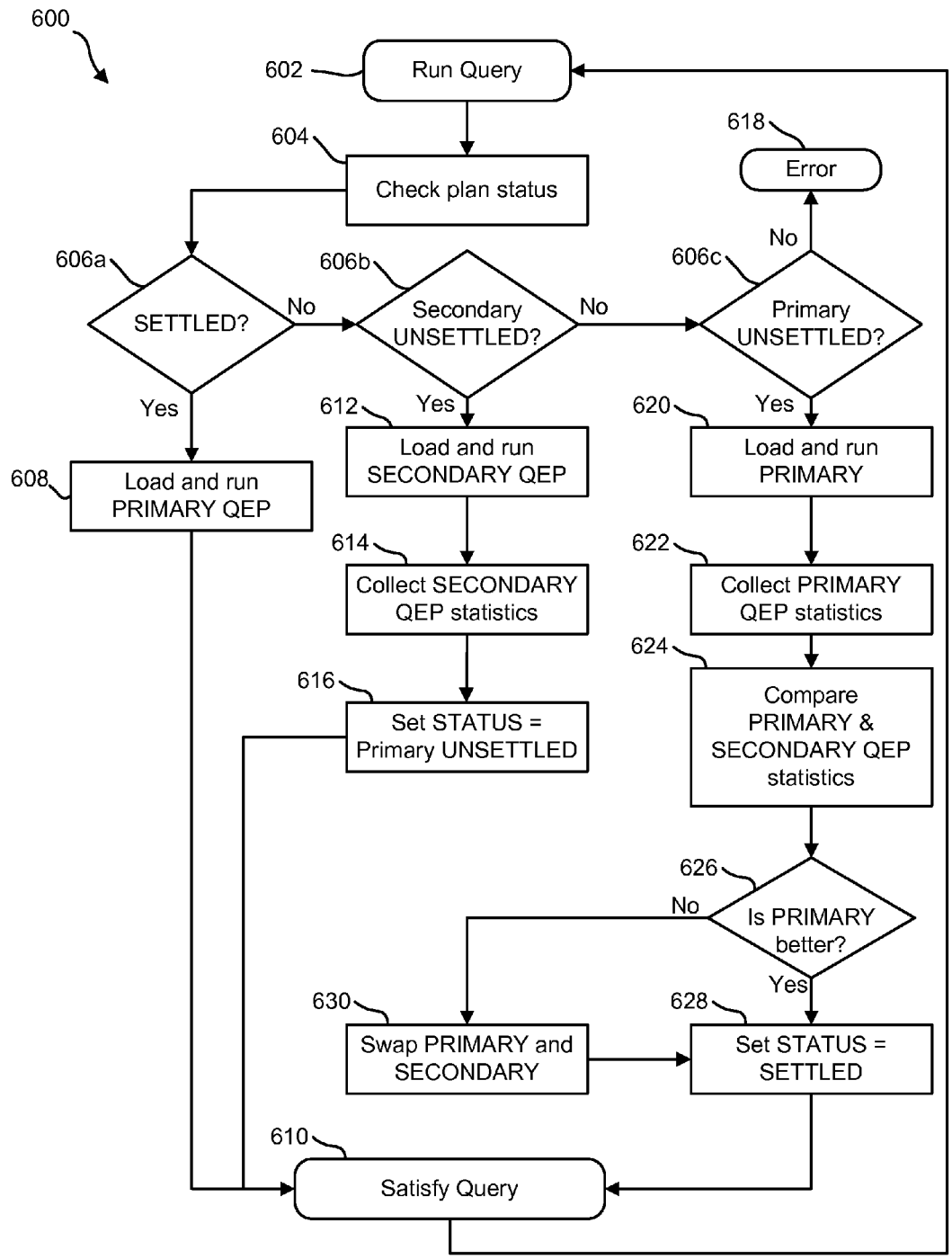
FIG. 6 is a schematic flow chart diagram illustrating one embodiment of a method for ensuring query execution plan stability in a database management system during runtime in accordance with the present invention.

FIG. 6 is a schematic flow chart diagram illustrating one embodiment of a method 600 for ensuring query execution plan stability in a database management system during runtime in accordance with the present invention. The method 600 begins for a SDQ 314 having an original QEP 316 and a new QEP 312 bound to the SDQ 314. If more than one QEP is not bound to the SDQ 314 the method 600 may be bypassed. Alternatively, the status indicator 322 may be set to "SETTLED" such that the single QEP is treated as the primary QEP 318.

The method 600 begins 602 and the binding management module 222 checks 604 the status indicator 322. Next the binding management module 222 determines 606a, b, c the value of the status indicator 322. If the binding management module 222 determines 606a that the status indicator 322 is "SETTLED", the binding management module 222 signals the DBE 214 to load and run 608 the QEP designated as the primary QEP 318. Next the method 600 terminates by satisfying 610 the query. The method 600 awaits a subsequent query. Once a subsequent query is received, the method 600 returns to running 602 the query.

If the binding management module 222 determines 606b that the status indicator 322 is "Secondary UNSETTLED", the binding management module 222 signals the DBE 214 to load and run 612 the QEP designated as the secondary QEP 320. As the secondary QEP 320 is run, the monitoring module 308 collects 614 execution statistics about the secondary QEP 320. In one embodiment, the binding management module 222 sets 616 the status indicator 322 to "Primary UNSETTLED." The method 600 then continues and satisfies 610 the query.

In certain embodiments, the binding management module 222 determines whether sufficient execution statistics exist for the secondary QEP 320 prior to setting the status indicator 322 to "Primary UNSETTLED." For example, the binding management module 222 may be required to collect execution statistics for a series of executions prior to setting the status indicator 322 to "Primary UNSETTLED."

If the binding management module 222 determines 606b that the status indicator 322 is not "Secondary UNSETTLED," the binding management module 222 determines 606c if the status indicator 322 is "Primary UNSETTLED." If not an error condition exists and the binding management module 222 signals 618 an error. If the status indicator 322 is "Primary UNSETTLED," the binding management module 222 signals the DBE 214 to load and run 620 the QEP designated as the primary QEP 318. As the primary QEP 318 is run, the monitoring module 308 collects 614 execution statistics about the primary QEP 318. In one embodiment, execution statistics are collected for a single request that executes the primary QEP 318. In an alternative embodiment, the binding management module 222 tracks the iterations that execute the primary QEP 318 and collects execution statistics until a sufficient set of execution statistics exists.

Once sufficient execution statistics are collected (or exist from previous query executions) for both the primary QEP 318 and the secondary QEP 320, the selection module 310 compares 624 the execution statistics of the primary QEP 318 and the execution statistics of the secondary QEP 320. The selection module 310 may, in certain embodiments, apply performance criteria as part of the comparison of execution statistics of the primary QEP 318 and the execution statistics of the secondary QEP 320. Next, the selection module 310 determines 626 whether to change the designation of the primary QEP 318. If the execution statistics of the primary QEP 318 indicate that the performance of the primary QEP 318 exceeds that of the secondary QEP 320, the binding management module 222 sets 628 the status indicator 322 to "SETTLED."

If the execution statistics of the secondary QEP 320 indicate that the performance of secondary QEP 320 exceeds that of the primary QEP 318, the binding management module 222 automatically swaps 630 the QEP (either the original QEP 316 or the new QEP 312) that is designated as the primary QEP 318 with the QEP (either the original QEP 316 or the new QEP 312) that is designated as the secondary QEP 320. Alternatively, certain embodiments may permit a user to indicate whether or not to make the swap automatically. Next, the binding management module 222 sets 628 the status indicator 322 to "SETTLED." The method 600 then continues and satisfies 610 the query and the method 600 ends.

In certain embodiments, once the binding management module 222 has experienced a status indicator 322 cycle that has progressed from one of "Secondary UNSETTLED" or "Primary UNSETTLED" to "SETTLED." The execution statistics may optionally be discarded in order to conserve storage space. In addition or alternatively, the QEP designated as secondary QEP may also be discarded to converse storage space. Of course, the user may control through the interface 206 whether to execute these storage space conservation actions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code executable to perform operations for ensuring query execution plan stability in a database management system, the operations of the computer program product when performs by a processor and a memory comprises:

binding a static database query to a new query execution plan (QEP) that produces the same result set as an original QEP bound to the static database query;

identifying one of the original QEP and the new QEP as a primary QEP;

automatically collecting execution statistics for the original QEP and the new QEP; automatically selecting one of the original QEP and the new QEP as the primary QEP in response to completion of the automatic collection of execution statistics, the primary QEP selected such that the automatically selected QEP provides optimal execution performance based on performance criteria in comparison to the automatically unselected QEP, the primary QEP selected based on the execution statistics; and generating a report for a user, the report comprising one or more or execution statistics for the original QEP, execution statistics for the new QEP, the static database query, an identifier of the static database query, an identifier of the QEP automatically selected as the primary QEP, an identifier of the QEP automatically selected as the secondary QEP, a state indicator describing the state of the status indicator; and providing the report to the user in response to a user command.

2. The computer program product of claim 1, further comprising, associating a status indicator with the bound static database query, the original QEP, and the new QEP;

wherein automatically collecting execution statistics further comprises, executing the secondary QEP for a first request to execute the bound static database query, the secondary QEP selected based on the status indicator;

collecting execution statistics during execution of the executed QEP;

executing the primary QEP in response to a second request to execute the bound static database query the primary QEP selected based on the status indicator; and collecting execution statistics during execution of the primary QEP for the second request.

3. The computer program product of claim 2, wherein the status indicator assumes one of three states, the states comprising settled, secondary QEP unsettled, and primary QEP unsettled.

4. The computer program product of claim 1, further comprising, storing the new QEP for the static database query;
identifying the new QEP as the primary QEP;
determining that the static database query includes a stored original QEP;
identifying the stored original QEP as the secondary QEP in response to the static database query including a stored original QEP;
setting a status indicator to a state that triggers comparison of execution statistics for the primary QEP and the secondary QEP, in response to the primary QEP and the secondary QEP being different.

5. The computer program product of claim 4, further comprising, comparing the primary QEP and the secondary QEP;
determining that the primary QEP and the secondary QEP are the same; and
setting the status indicator to a state that avoids comparison of execution statistics for the primary QEP and the secondary QEP in response to determining that the primary QEP and the secondary QEP are the same.

6. The computer program product of claim 1, further comprising using the primary QEP to satisfy a request to execute the bound static database query in response to a status indicator set to a state that avoids comparison of execution statistics for the primary QEP and one or more other QEPs.

7. The computer program product of claim 1, wherein the execution statistics are selected from the group consisting of whether the query completed execution, the I/O profile for the QEP, the QEP execution time, the number of rows referenced, the number of rows returned, and a timestamp for when the QEP was executed.

8. The computer program product of claim 1, further comprising:

receiving a revert command from a user in response to automatic selection of one of the original QEP and the new QEP as the primary QEP; and swapping the QEP identified as the primary QEP with the QEP identified as the secondary QEP in response to the revert command.

9. The computer program product of claim 8, further comprising setting a status indicator associated with the bound static database query, the primary QEP, and the secondary QEP to a state that triggers comparison of execution statistics for the primary QEP and the secondary QEP.

10. A computer program product comprising a computer readable medium having computer usable program code executable to perform operations for ensuring query execution plan stability in a database management system, the operations of the computer program product when performs by a processor and a memory comprises:

receiving a new query execution plan (QEP) that produces the same result set as an original QEP bound to a static database query;

binding the static database query to the new QEP and to the original QEP;

identifying the new QEP as a primary QEP;

associating a status indicator with the bound static database query, the primary QEP, and the secondary QEP;

setting the status indicator to indicate the secondary QEP is unsettled; executing the secondary QEP in response to a first request to execute the bound static database query and the status indicator indicating that the primary QEP and secondary QEP are not settled;

collecting execution statistics during execution of the secondary QEP; setting the status indicator to indicate the primary QEP is unsettled and send a response to the first request; executing the primary QEP in response to a second request to execute the bound static database query and the status indicator indicating the primary QEP is unsettled;

collecting execution statistics during execution of the primary QEP; determining whether the primary QEP or the secondary QEP provides optimal execution performance based on the collected execution statistics and on performance criteria;

automatically swapping a QEP of the primary QEP with a QEP of the secondary QEP in response to the QEP associated with the secondary QEP providing more optimal results than a QEP associated with the primary QEP; and setting the status indicator to indicate that the primary QEP and secondary QEP are settled and send a response to the second request.

11. The computer program product of claim 10, wherein the status indicator assumes one of three states, the states comprising settled, secondary QEP unsettled, and primary QEP unsettled.

12. The computer program product of claim 10, further comprising:

generating a report for a user, the report comprising one or more of execution statistics for the original QEP, execution statistics for the new QEP, the static database query, a QEP automatically swapped to become the primary QEP, a QEP automatically swapped to become the secondary QEP, a state indicator describing the state of the status indicator; and providing the report to the user in response to a user command.

13. The computer program product of claim 10, further comprising:
receiving a revert command from a user in response to automatic swapping of one of the original QEP and the new QEP as the primary QEP; and
swapping the QEP identified as the primary QEP with the QEP identified as the secondary QEP in response to the revert command.

14. The computer program product of claim 10, further comprising setting the status indicator to a state that triggers comparison of execution statistics for the primary QEP and the secondary QEP in response to a user command.

15. A database management system configured to ensure query execution plan stability, the database management system comprising:
at least one processor within a computer system in electronic communication with at least one database stored on at least one persistent storage device and at least one client computer system over a communication network;
a memory configured to store operational data and computer instructions executable by the at least one processor, the computer instructions configured to cause the computer system to:
receive a new query execution plan (QEP), in response to a user command provided by a user interface in communication with the computer system, the QEP producing the same result set as an original QEP bound to a static database query;
store the new QEP in the at least one persistent storage device and bind the static database query to the new QEP;
designate the new QEP as a primary QEP;
automatically collect execution statistics for the original QEP and the primary QEP in response to at least two requests to execute the static database query; and
automatically swap the new QEP with the original QEP, such that the original QEP becomes the primary QEP and the new QEP becomes a secondary QEP in response to the execution statistics of the original QEP exceeding a user-configurable threshold, the user-configurable threshold comprising at least one execution statistic for the new QEP.

16. The database management system of claim 15, wherein automatic collection of execution statistics and automatic swapping of the new QEP and the original QEP is controlled based on a status indicator that assumes one of three states, the states comprising settled, secondary QEP unsettled, and primary QEP unsettled, the original QEP designated as a secondary QEP.

17. The database management system of claim 15, further comprising computer instructions configured to cause the computer system to:
receive a revert command from a user in response to automatic swapping of one of the original QEP and the new QEP as the primary QEP; and
swap the QEP identified as the primary QEP with the QEP identified as the secondary QEP in response to the revert command.

18. The database management system of claim 15, further comprising setting the status indicator to a secondary QEP unsettled state in response to a user command, the secondary QEP unsettled state reinitiating comparison of execution statistics for the primary QEP and the secondary QEP in response to a request to execute the static database query.

* * * * *